May 16, 1961 H. P. KOFFEL 2,984,371
DISPENSING CARTON CARRIER FOR VEHICLES
Filed March 4, 1959 2 Sheets-Sheet 1

Herbert P. Koffel
INVENTOR.

BY Clarence A. O'Brien
and Harvey B. Jacobson
Attorneys

May 16, 1961  H. P. KOFFEL  2,984,371
DISPENSING CARTON CARRIER FOR VEHICLES
Filed March 4, 1959  2 Sheets-Sheet 2

Herbert P. Koffel
INVENTOR.

BY Clarence A. O'Brien
and Harvey B. Jacobson
Attorneys

United States Patent Office 2,984,371
Patented May 16, 1961

2,984,371

DISPENSING CARTON CARRIER FOR VEHICLES

Herbert P. Koffel, R.D. 1, Salfordville Road,
Schwenksville, Pa.

Filed Mar. 4, 1959, Ser. No. 797,181

5 Claims. (Cl. 214—85)

This invention relates to improvements in dispensing carriers for transporting commercial cartons of eggs or other commodities in vehicles.

The primary object of the invention is to provide a car top carrier for such cartons or boxes in the form of an elongated chute adapted to be attached in the top of the closed body of an automobile, such as a milk delivery truck, to safely transport boxes of eggs above milk bottle crates, and the like, in the truck, and with a front end within easy reach from the driver's seat and from which the egg boxes can be readily removed, together with means for vertically swingably attaching the chute in suspended position at the rear end of the top of the body for vertical tilting upwardly into substantially horizontal position when carrying eggs long distances, from place to place, and for tilting downwardly into forwardly sloping position to cause the eggs to gravitate in the chute to the front end of the chute for ready removal from said front end by the driver of the truck.

Another object is to provide a carrier according to the foregoing, together with means for suspending the chute from the top of the truck without altering said top, and guide means for preventing excessive side sway of the chute such as would tend to break or unduly shake the eggs.

Still another object is to provide a carrier in accordance with the foregoing which is of simple, inexpensive construction, light in weight, yet durable, safe to use, and easily and quickly attached to and detached from the top of the closed body of such a truck.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
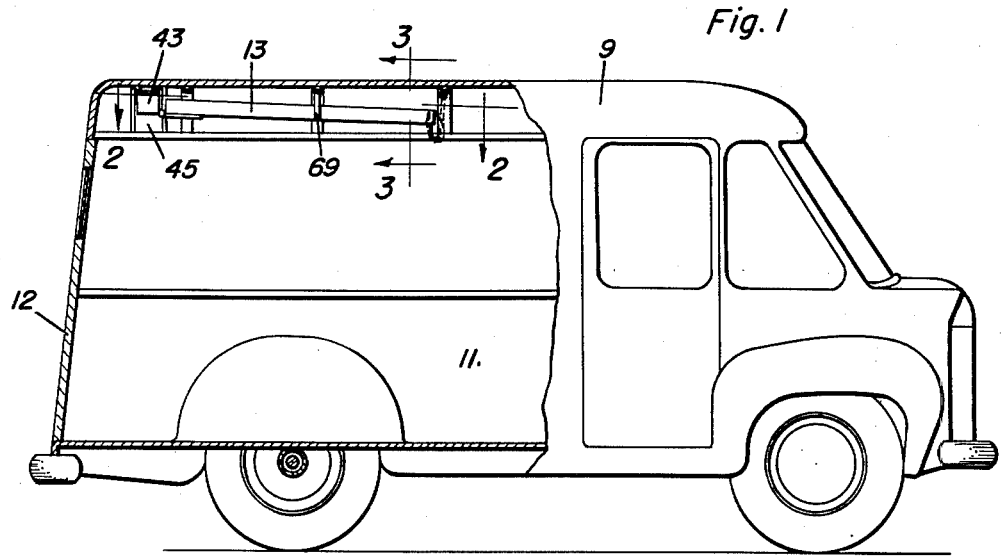
Figure 1 is a view in side elevation, partly broken away and shown in section, of an egg box carrier according to this invention suspended in the top portion of the closed body of the milk delivery truck.
Figure 2:
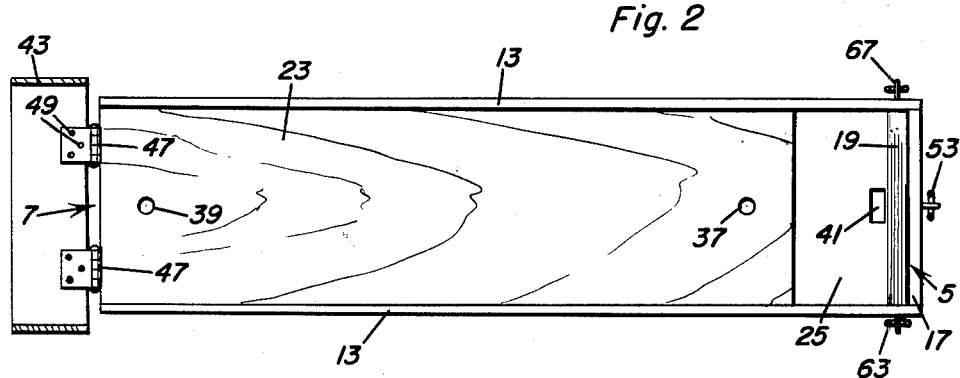
Figure 2 is an enlarged view in vertical section taken on the line 2—2 of Figure 1.
Figure 3:
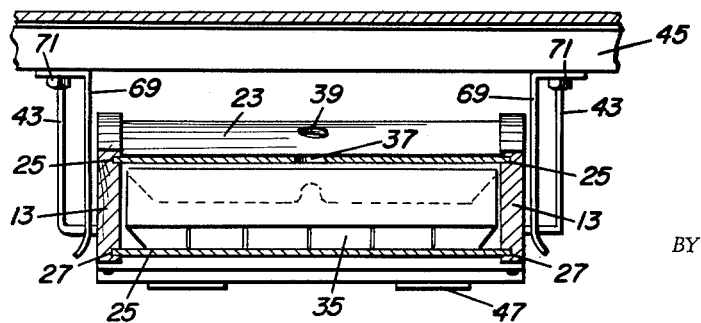
Figure 3 is a further enlarged view in vertical transverse section taken on the line 3—3 of Figure 1.

Referring to the drawings by numerals, according to the preferred embodiment of this invention, an egg box carrier, designated generally by the numeral 1, is provided comprising an elongated rectangular chute 3 having a front end 5 and a rear end 7 and which is suspended, by means presently described, in the upper portion of a closed body 9 of a milk delivery truck 11 to extend forwardly from a point adjacent the back 12 of the body 9 with its front end 5 adjacent the driver's seat, not shown.

The chute 3 comprises a pair of parallel side bars 13, a rear crossbar 15 closing the rear end 7 of the chute 3 and a transverse stop bar 17 at the front end 5 of said chute. The stop bar 17 has an inner face 19 slanting upwardly and forwardly out of the chute 3, for a purpose presently explained.

Top and bottom panels 21, 23 are provided in the chute 3 and are mortised at their side edges in top and bottom longitudinal grooves 25, 27 in the side bars 13. The bottom panel 23 is suitably fixed in the grooves 27 in the side bars 13 and closes the bottom of the chute 3. The top panel 21 extends from the rear crossbar 15 and is spaced from the top bar 17 a distance such that egg boxes may be lifted out of the front end of the chute upwardly over the stop bar 17. As will be seen, the top panel 21 is shorter than the length of the chute 3 for manual sliding forwardly and rearwardly to open the top of the chute at its front and rear ends alternately.

A bottom attaching, cross panel 29 at the rear end 7 of the chute 3 is suitably fixed to and cross connects the side bars 13 which are also cross connected by cross cleats 31 spaced apart longitudinally of the side bars 13 and suitably secured to the bottoms thereof, as at 33, in engaging supporting relation to the bottom panel 23.

The top and bottom panels 21, 23 are spaced apart a distance slightly greater than the depth of commercial egg boxes 35 so that such boxes will not bounce in the chute 3 and may slide forwardly under the influence of gravity if the chute 3 is sloped forwardly and downwardly. Also the chute 3 is of a width for loading therein a single longitudinally extending row of such boxes. A pair of front and rear finger grip openings 37, 39 are provided in the top panel 21 for sliding said panel. A finger receiving opening 41 is provided in the front portion of the bottom panel 23 for pushing a front box 35 of a row upwardly out of the front end of the chute 3.

The chute 3 is vertically swingably suspended at its rear end 7 in the upper portion of the body 9 for swinging upwardly and downwardly in forwardly extended position in said body 9 by means of a generally U-shaped attaching bracket 43 welded, as at 44 in depending position to the rear bow 45 in the body 9, and a pair of hinges 47 secured to said bracket 43 and to the bottom face of the panel 29 as by screws 49, 51, the hinges 47 suspending the rear end 7 of the chute 3 sufficiently spaced below the top of the body 9 to provide for convenient access to the rear opening 39 in the top panel 21 for sliding of said panel and also for easy access to the rear end of the chute 3 at its top for a purpose presently apparent.

Means is provided for releasably suspending the front end 5 of the chute 3 with said chute 3 in substantially horizontal position comprising a snap hook 53 engageable with an eyebolt 55 in the stop bar 17 and attached by a swivel 57 and an eyebolt 59 to a forward bow 61 of the body 9 in suspended position.

A pair of chains 63 at opposite sides and the front end 5 of the chute 3 are terminally attached by eyebolts 65, 67 to the bow 61 and to said side bars 13 and provide means for suspending the front end 5 of the chute 3 with the chute in forwardly and downwardly swung sloping position, when the snap hook 53 is released from the eyebolt 35.

A pair of guide bars 69 at opposite sides of the chute 3 and between its ends depend from and are suitably bolted, as at 71, to an intermediate bow 73 of the body 9 and provide means for preventing excessive side sway, or vibration, of the chute 3 such as would injuriously shake eggs in the egg boxes 35.

Figure 4:
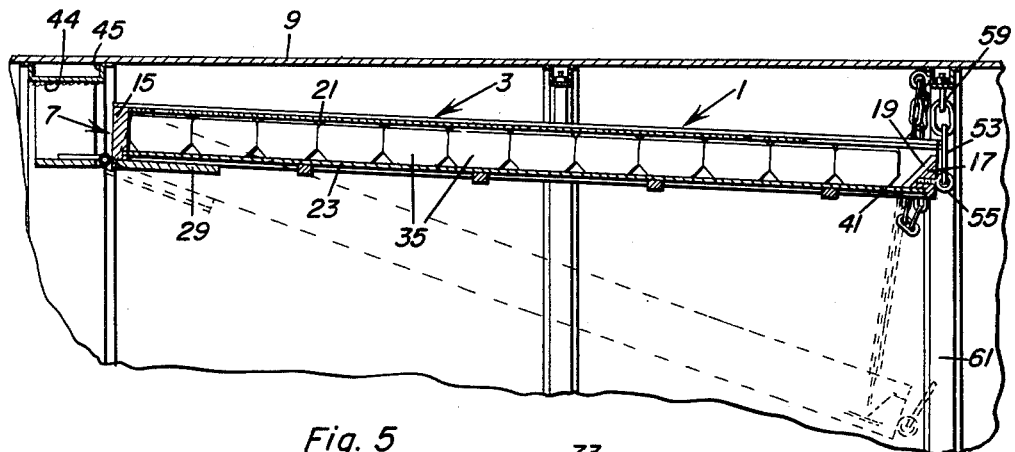
Figure 4 is an enlarged fragmentary view in vertical longitudinal section taken through the carrier and body of the truck and illustrating, in broken lines, the manner in which the chute is tilted downwardly into inclined position from a substantially horizontal position.
Figure 5:
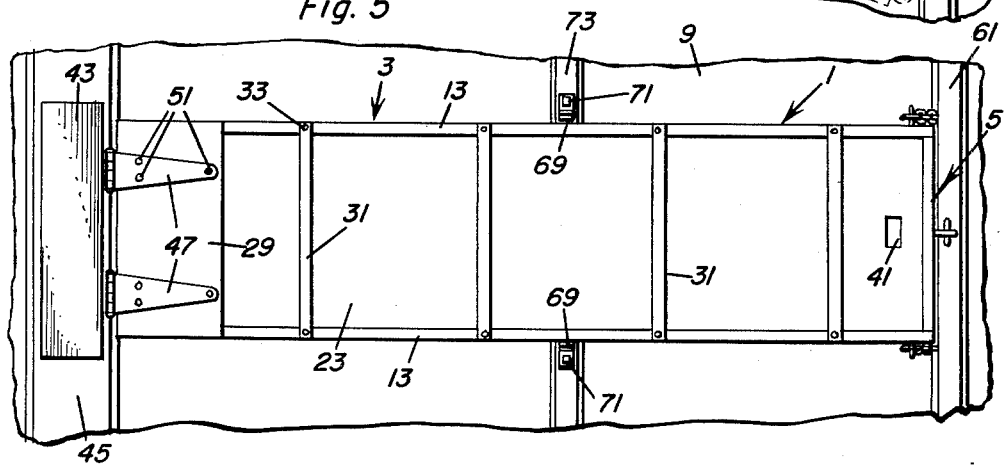
Figure 5 is an enlarged fragmentary view in bottom plan of the carrier and part of the top of the body of the truck.
Figure 6:
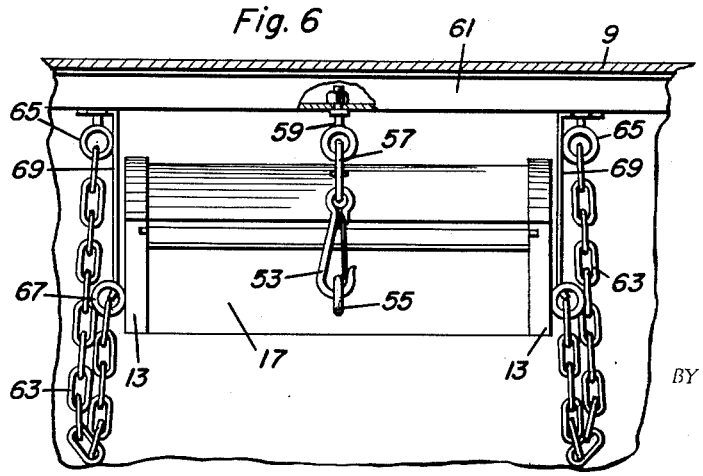
Figure 6 is an enlarged fragmentary view of the chute in front elevation with the top of the body of the truck shown in transverse section.

The operation and use of the carrier will be readily understood. To load the chute 3, the snap hook 53 is released, or disengaged, from the eyebolt 55 and the chute is swung downwardly into forwardly and downwardly sloping position, as shown in broken lines in Figure 4, in which position it is suspended at its front end 5 by the chains 63. The top panel 21 is then slid forwardly to space it from the rear bar 15 and open the top of the chute at the rear end 7 of said chute. Egg boxes 35 are then loaded into the rear end of the chute 3 to slide forwardly in a row until the front egg box 35 is stopped by the stop bar 17. Top panel 21 is then slid rearwardly to open the chute 3 at its top and front end 5 sufficiently for removal of the front egg box 35 of the row upwardly out of the chute 3. The chute 3 is then swung upwardly into substantially horizontal position, as shown in full lines in Figures 1 and 4, and the snap hook 53 engaged with the eyebolt 55 to hold said chute 3 in said position for transporting the egg boxes 35 from place to place.

When it is desired to unload and deliver an egg box 35, snap hook 53 is disengaged from the eyebolt 55 and the chute 3 eased downwardly into its sloping position for holding in that position by the chains 63. Then the front egg box 35 of the row may be removed upwardly by inserting the fingers of one hand upwardly through the opening 41 to push the front egg box 35 upwardly, whereupon as it gravitates against the stop bar 17 the upwardly slanting face 19 of the stop bar will cause said egg box to be cammed upwardly and forwardly for easy grasping thereof to remove the same. After the front egg box 35 has been removed, the row will gravitate slidably forwardly to position a new egg box 35 at the front end 5 of the chute 3 for unloading of the egg boxes 35 from the row successively. As will be seen, the row may be replenished with egg boxes 35 at the rear end of the chute as the egg boxes 35 are removed from the front end of the chute 3. Thus egg boxes 35 of older eggs in the chute 3 may be removed therefrom before those subsequently loaded into said chute.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. The combination of a vehicle body including a top, a rear end and a front end with a driver's seat, and a dispensing carrier for cartons provided in said body under said top, said carrier comprising an elongated chute extending longitudinally in said body and adapted to receive a row of cartons therein, means hingedly attaching the rear end of said chute to the underside of said top adjacent the rear end of the body for swinging movement in a vertical plane between a substantially horizontal storage position and a sloping dispensing position wherein the front end of the chute is adjacent to and accessible from the driver's seat, releasable means provided at the front end of the chute and connected to said top for sustaining the chute in its storage position, and means provided at said front end of the chute and connected to said top for supporting the chute in its dispensing position upon releasing of said last mentioned means.

2. The device as defined in claim 1 wherein said means for sustaining the chute in its storage position comprise a fastener member secured to and depending from said top, and a coacting fastener element secured to said front end of the chute and releasably engaged by said fastener member.

3. The device as defined in claim 1 wherein said means for supporting the chute in its dispensing position comprise an elongated flexible element anchored at one end thereof to said top and anchored at its other end to said front end of the chute.

4. The device as defined in claim 1 wherein said chute comprises a bottom wall, a pair of side walls at opposite side edges of said bottom wall, an end wall extending between said side walls at the rear end of the chute, a carton stop bar extending along said bottom wall between said side walls at said front end of the chute, and a cover slidably mounted on said side walls, said cover being shorter than said bottom wall whereby to selectively provide a dispensing opening at the top of the chute adjacent said stop bar when the cover is slid toward said end wall and a loading opening at the top of the chute adjacent the end wall when the cover is slid toward the stop bar.

5. The device as defined in claim 1 together with a pair of guide members secured to and depending from said top at opposite sides of the intermediate portion of said chute, whereby to prevent the chute from becoming laterally displaced.

References Cited in the file of this patent

UNITED STATES PATENTS

| | | |
|---|---|---|
| 782,430 | Tone | Feb. 14, 1905 |
| 2,024,596 | Pfeiffer et al. | Dec. 17, 1935 |
| 2,556,399 | Sanger et al. | June 12, 1951 |
| 2,637,430 | Katz | May 5, 1953 |